US009292572B2

(12) United States Patent  
Nagpal et al.

(10) Patent No.: US 9,292,572 B2
(45) Date of Patent: Mar. 22, 2016

(54) DATABASE INDEX PROFILE BASED WEIGHTS FOR COST COMPUTATION

(71) Applicant: International Business Machines Corporation, Armonk, NY (US)

(72) Inventors: Abhinay R. Nagpal, Pune (IN); Sandeep R. Patil, Elmsford, NY (US); Gopikrishnan Varadarajulu, Kundanahalli (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/316,294

(22) Filed: Jun. 26, 2014

(65) Prior Publication Data
US 2014/0310261 A1    Oct. 16, 2014

Related U.S. Application Data

(63) Continuation of application No. 13/013,915, filed on Jan. 26, 2011, now abandoned.

(51) Int. Cl.
G06F 17/30 (2006.01)
(52) U.S. Cl.
CPC .... *G06F 17/30469* (2013.01); *G06F 17/30336* (2013.01)
(58) Field of Classification Search
CPC .................... G06F 17/30469; G06F 17/30336
See application file for complete search history.

(56) References Cited

U.S. PATENT DOCUMENTS

| 6,023,699 | A | 2/2000 | Knoblock et al. |
|---|---|---|---|
| 6,269,375 | B1 | 7/2001 | Ruddy et al. |
| 7,000,141 | B1 | 2/2006 | Karlsson et al. |
| 2008/0198492 | A1 | 8/2008 | Ahn |
| 2008/0222104 | A1 | 9/2008 | Stewart et al. |
| 2009/0132475 | A1 | 5/2009 | Hinshaw et al. |
| 2010/0088459 | A1 | 4/2010 | Arya et al. |
| 2012/0191701 | A1 | 7/2012 | Nagpal et al. |

FOREIGN PATENT DOCUMENTS

JP    2009163647    7/2009

OTHER PUBLICATIONS

"U.S. Appl. No. 13/013,915 Final Office Action", Jan. 2, 2013, 31 pages.
"U.S. Appl. No. 13/013,915 Office Action", Aug. 1, 2012, 32 pages.
(Continued)

*Primary Examiner* — Huawen Peng
(74) *Attorney, Agent, or Firm* — DeLizio Law, PLLC

(57) ABSTRACT

Database tables can have different types of database indices defined for the database tables and different numbers of database indices. The efficiency of reading the indexes can vary with the different profiles of the indexes, which impacts the costs of access plans that use the indexes. Weights can be predefined to reflect the relative efficiencies of the different characteristics. Costs can be computed in accordance with a variety techniques (e.g., based on edge traversals). The weights can be predefined to reduce costs, increase costs, or a combination thereof. A database management application or associated application or program can also refine or revise these weights based on statistical data gathered about the operation of the database and/or heuristics that are developed based on observations/research. The corresponding weights can be adjusted accordingly.

23 Claims, 5 Drawing Sheets

(56) References Cited

OTHER PUBLICATIONS

"U.S. Appl. No. No. 13/013,915 Office Action", Sep. 20, 2013, 26 Pages.

Arnan, et al., "Dynamic Data Reallocation in Disk Arrays", ACM Transactions on Storage, vol. 3, No. 1, Article 2, Mar. 2007, 16 pages.

Harizopoulos, et al., "Energy Efficiency: The New Holy Grail of Data Management Systems Research", 4th Biennial Conference on Innovative Data Systems Research (CIDR) Jan. 4-7, 2009, Asilomar, California, USA., Jan. 4, 2009, 8 pages.

Hutsell, "Faster SQL Server Access With Solid State Disks", Texas Memory Systems, Jul. 2008, 17 pages.

Karabuto, "HDD Diet 2: Power Consumption and Heat Dissipation of Enterprise Hard Disk Drives", iXBT Labs, Mar. 2, 2006, 22 pages.

Karabuto, "HDD Diet: Power Consumption and Heat Dissipation", iXBT Labs, Jul. 11, 2005, 16 pages.

Kim, et al., "HeteroDrive: Reshaping the Storage Access Pattern of OLTP Workload Using SSD", In Proceedings of 4th International Workshop on Software Support for Portable Storage, Oct. 27, 2009, 5 pages.

Microsoft, "Win32_DiskDrive Class", Oct. 26, 2010, 14 pages.

Payer, et al., "Combo Drive: Optimizing Cost and Performance in a Heterogeneous Storage Device", In Proc. Workshop on Integrating Solid-state Memory into the Storage Hierarchy (WISH), co-located with ASPLOS, 2009, Feb. 16, 2009, 8 pages.

Ramamurthy, "Buffer Pool Aware Query Optimization", In Proc. CIDR, 2005, 12 pages.

"Fujitsu Small Form Factor Disk Drive White Paper", The Economic Power of Lower Power Consumption, 2008, 5 pages.; http://www.fujitsu.com/downloads/COMP/fcpa/hdd/sff-sas2_wp.pdf (Obtained from the Internet on Oct. 14, 2010).

Ioannidis, "Query Optimization", 1996, 38 pages; http://infolab.stanford.edu/~widom/cs346/ioannidis.pdf (Obtained from the Internet on Nov. 15, 2010).

DATABASE INDEX PROFILE BASED WEIGHTS FOR COST COMPUTATION

RELATED APPLICATIONS

This application is a Continuation of and claims the priority benefit of U.S. application Ser. No. 13/013,915 filed Jan. 26, 2011.

BACKGROUND

Embodiments of the inventive subject matter generally relate to the field of database systems and, more particularly, to using database index profile based weights to influence computation of access plan costs.

A database management application generates multiple access plans to implement a database query. The database management application includes a query optimizer, which selects a most efficient one of the generated access plans based on costs calculated for the access plans. The query optimizer calculates the costs associated with each access plan.

SUMMARY

Embodiments include a method comprising collecting profile data for each of a plurality of database indices of a database hosted across a plurality of storage devices. The profile data at least indicates for each database index whether the database index is clustered or non-clustered and a type of storage device that hosts the database index. Weights for the plurality of database indices are selected based, at least in part, on the profile data. A cost for each of the plurality of database indices is calculated using the selected weights. The cost for each database index is associated in storage with the database index.

Embodiments include a computer program product for database system infrastructure informed computation of access plan costs. The computer program product comprises a computer readable storage medium having computer readable program code embodied therewith. The computer readable program code is configured to determine physical locations of a plurality of database indices in a database system. The physical locations correspond to storage devices of the database system. The computer readable program code is configured to determine whether each of the plurality of database indices is clustered or non-clustered. The computer readable program code is configured to determine characteristics of the storage devices that host the plurality of indices based, at least in part, on the location of the plurality of database indices in the database system. The computer readable program code is configured to select weights for the plurality of database indices based on the characteristics and whether the database index is clustered or non-clustered. The computer readable program code is configured to compute costs of accessing the plurality of database indices with the weights. The computer readable program code is configured to store the computed costs of the plurality of database indices to later compute access plan costs of access plans that use the plurality of database indices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
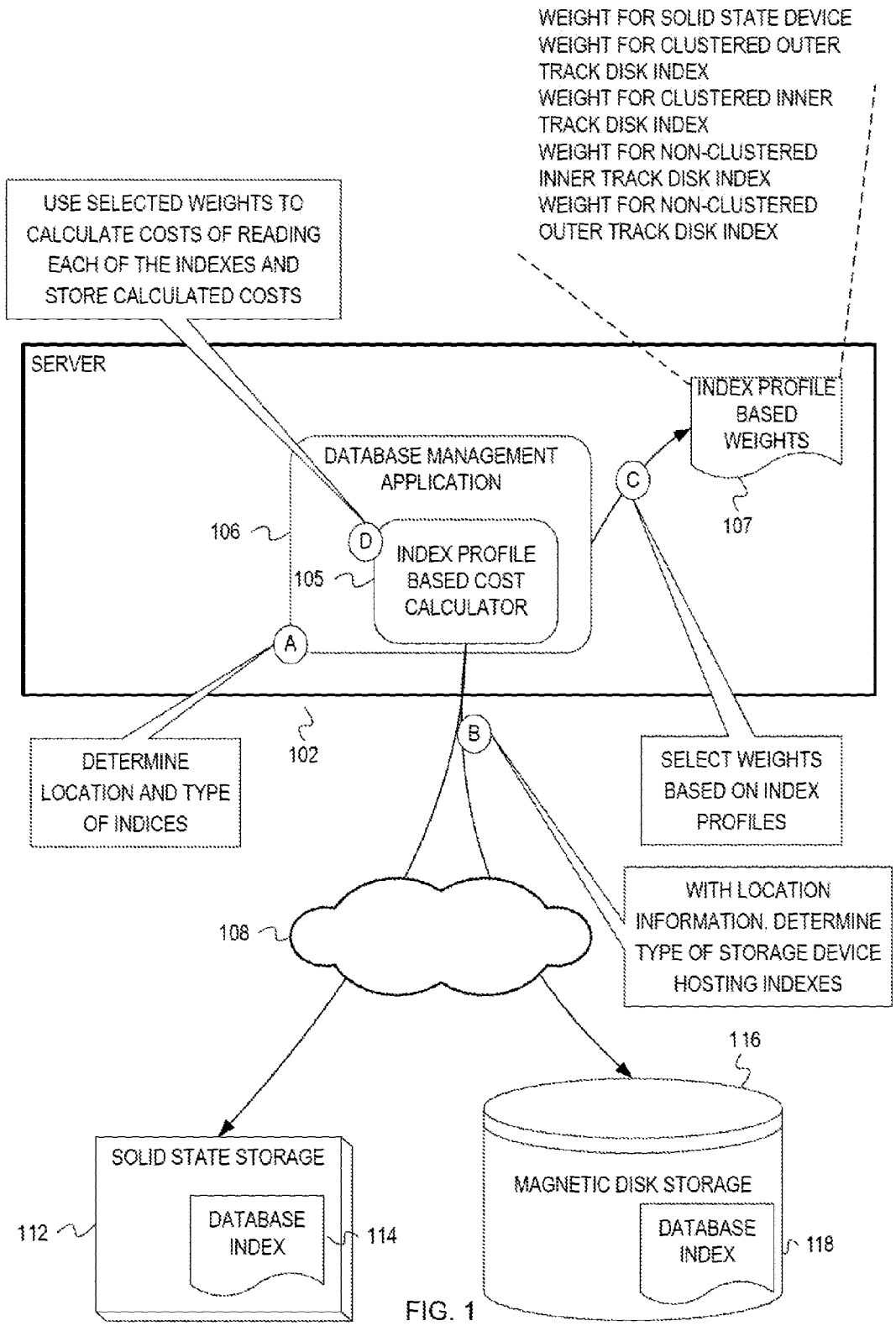
FIG. 1 depicts a conceptual diagram of an example database management application calculating costs of reading various indexes of a database.

The description that follows includes example systems, methods, techniques, instruction sequences and computer program products that embody techniques of the present inventive subject matter. However, it is understood that the described embodiments may be practiced without these specific details. For instance, although examples refer to considering solid state disks and magnetic disks when calculating costs of reading an index, other disk types can also be considered. In addition, embodiments are not limited to a "table" type structure despite the reference to database tables in the illustrations. Embodiments can implement a database object in accordance with various database technology that uses database indices. In other instances, well-known instruction instances, protocols, structures and techniques have not been shown in detail in order not to obfuscate the description.

The description uses the terms application and program. A program or computer program refers to instructions or code that is executable by a machine, device, computer, etc. An application can comprise one or more programs. A program of an application can comprise a library. And a program can comprise calls or invocations to other programs or application program interfaces.

Database tables can have different types of database indices defined for the database tables and different numbers of database indices. A database index, comprises a data structure typically created from columns of a database table. The efficiency of reading the indexes can vary with the different profiles of the indexes, which impacts the costs of access plans that use the indexes. The profile of an index can comprise whether it is clustered or non-clustered, the type of device that hosts the index, and where the index resides on a magnetic disk. Weights can be predefined to reflect the relative efficiencies of the different characteristics. Weights can be predefined to reflect a greater efficiency of reading an index from a solid state drive over a magnetic disk. Weights can be predefined to reflect a greater efficiency of reading an index from a clustered index from a magnetic disk than a non-clustered index from a magnetic disk. Weights can be predefined to reflect a greater efficiency of reading an index from an outer track of a magnetic disk than an inner track of a magnetic disk. Costs can be computed in accordance with a variety of techniques (e.g., based on edge traversals). The weights can be predefined to reduce costs, increase costs, or a combination thereof. For example, weights can be predefined to decrease the calculated cost of an access plan (or part of an access plan) that uses a clustered index on an outer track of a magnetic disk by 30%. or to increase the calculated cost of an access plan (or part of an access plan) that uses a non-clustered index on an inner track of a magnetic disk by 25%. A database management application or associated application or program can also refine or revise these weights based on statistical data gathered about the operation of the database and/or heuristics that are developed based on observations/ research. For example, it may be observed that reading a clustered index from an inner track of a magnetic disk is more efficient than reading a non-clustered index from an outer track. The corresponding weights can be adjusted accordingly.

A database management application can evaluate a database to collect initial profile information for indexes of the database. The database management application can then compute the costs of reading the indexes based on the collected profile information. The database management application can also periodically update the profile information and corresponding costs to reflect changes to the database. The database manage application can also determine whether the cost of reading an index should be recalculated responsive to detecting a change to a table associated with the index, and can collect profile information and calculate the cost of reading an index based on the collected profile information when an index is initially defined. The database management application does not necessarily collect all profile information and calculated costs for all indexes up front. Various criteria and/or time intervals can be configured for collecting index profile information and calculating the corresponding costs (e.g., certain times of day, start with least active disks, etc.). When a database query is received and access plans are generated, the database management application can utilize the already calculated costs of reading indexes used by the access plans to the database to calculate more informed access plan costs.

FIG. 1 depicts a conceptual diagram of an example database management application calculating costs of reading various indexes of a database. A server 102 is illustrated as hosting an executing instance Of a database management application 106. The database management application 106 is depicted as comprising an index profile based cost calculator 105. One or more databases managed by the database management application 102 are hosted on several storage devices communicatively coupled with the server 102 via a network 108. The network 108 is depicted as a cloud in FIG. 1, and can be any of a variety of networks that support a database system. Although any number of devices can be employed. FIG. 1 only depicts a solid state storage device 112 and a magnetic storage device 116. The solid state storage device 112 and the magnetic disk storage device 116 respectively host database index 114 and database index 118.

The server 102 is also depicted as hosting index profile based weights 107. A few examples of weights are depicted in FIG. 1. A "weight for solid state device" represents a weight to be selected for an index that resides on a solid state device. A "weight for clustered outer track disk index" represents a weight to be selected for a clustered, index that resides on an outer track of a magnetic disk. A "weight for clustered inner track disk index" represents a weight to be selected for a clustered index that resides on an inner track of a magnetic disk. A "weight for non-clustered outer track disk index" represents a weight to be selected, for a non-clustered index that resides on an outer track of a magnetic disk. A "weight for non-clustered inner track disk index" represents a weight to be selected for a non-clustered, index that resides on an inner track of a magnetic disk. Additional examples weights can include weights for keys of a non-clustered index that reside on inner or outer tracks of a magnetic disk. Embodiments can employ same weights for keys of a non-clustered index and the corresponding non-clustered index or different weights. Although the index profile based weights 107 are depicted as being stored at the server 102, embodiments are not so limited. The weights can be stored remotely or locally with an executing instance of a database management application.

At a stage A, the database management application 106 determines location and type of indexes for one or more tables of the database. The database management application determines whether indexes are clustered or non-clustered, and a network addresses or device names for storage devices that host the indexes. The location information and the index type information can be stored in metadata for the database.

At a stage B, the index profile based cost calculator 107 determines the types of storage devices hosting the indexes using the location information. The index profile based cost calculator 107 queries the storage devices 112, 116 to determine that the storage device 112 is of type solid state device and to determine that the storage device 116 is of type magnetic storage. If the storage device type hosting an index is a magnetic storage device, the index profile based cost calculator 105 determines whether the index resides on an inner track or an outer track. In FIG. 1, the index profile based cost calculator 105 queries the magnetic disk storage device 116 to determine whether the database index 118 resides on an inner track or an outer track of the disk 116.

At a stage C, the index profile based cost calculator 105 selects weights from the index based weights 107 based on the collected index profile information. For the database index 114, the index profile based cost calculator 105 selects the "weight for solid state device." For the database index 118, the index profile based cost calculator 105 selects one of the magnetic disk weights depending upon whether the database index 118 is clustered or non-clustered, and depending upon where the index 118 resides on the disk 118.

At a stage D, the index profile based cost calculator 105 uses the selected weights to calculate the costs of reading each of the indexes and stores the calculated costs. The index profile based cost calculator 105 will calculate a cost of reading the index 114 using the solid state device weight. The index profile based cost calculator 105 will calculate the cost of reading the index 118 using the selected weights for the index 118. The calculated costs of reading the indexes can be stored with the indexes (e.g., as metadata for the indexes), with the corresponding database tables, or in a separate structure, database, or repository of profile based index costs. Embodiments can calculate costs in terms of number of I/O operations, processor cycles, and/or time. For example, cost can be calculated as number of I/O operations and then converted into units of time.

It is not necessary to embody the functionality of collecting index profile information, selecting relevant weights, and calculating costs of reading indexes as part of a database management application. Embodiments can partition the functionality into different programs that may or may not be part of a database management application. Some or all of the functionality can be implemented via an application programming interface, for example.

Figure 2:
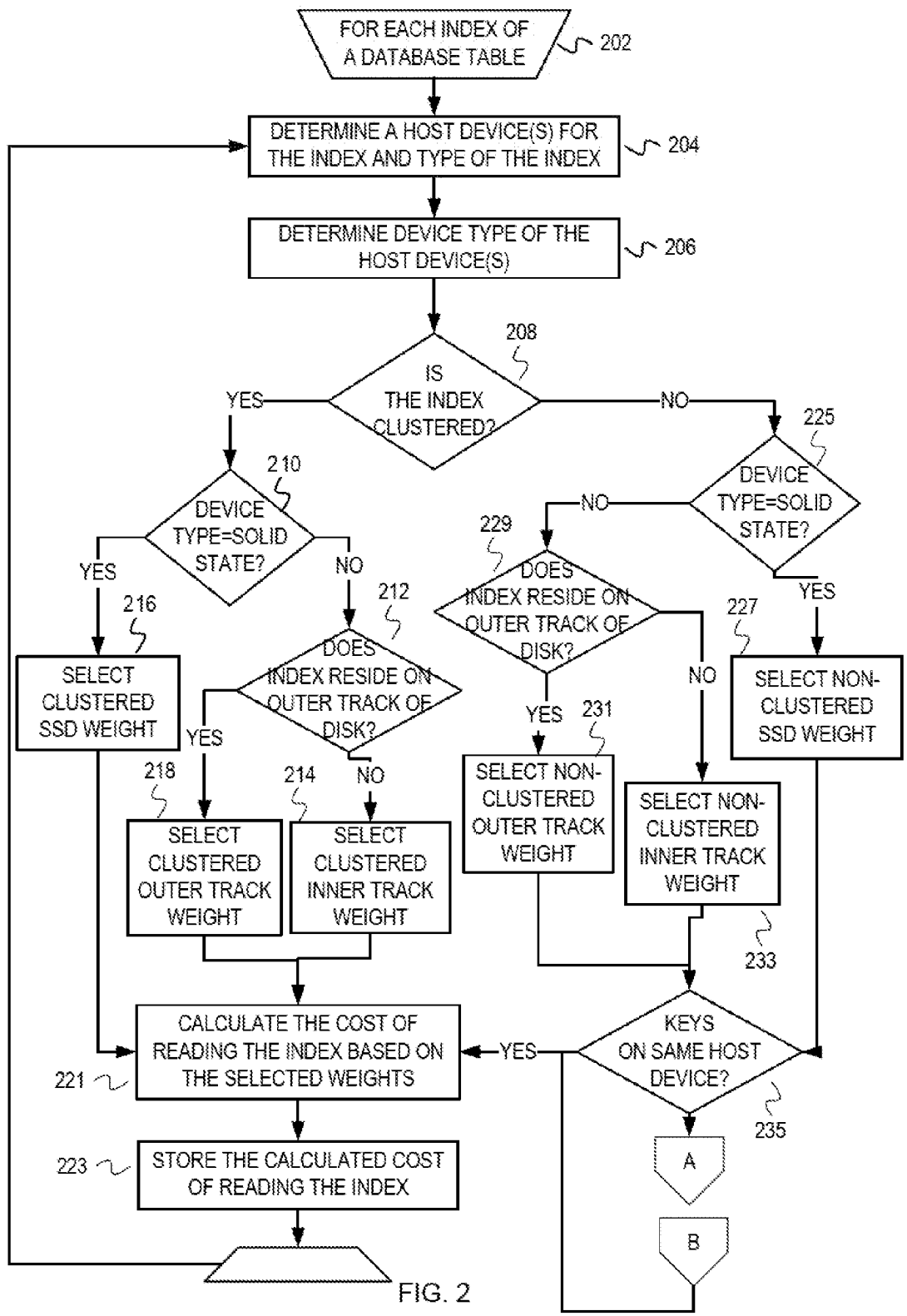
FIG. 2 depicts a flowchart of example operations for selecting weights based on collected index profiles.

FIG. 2 depicts a flowchart of example operations for selecting weights based on collected index profiles. At block 202, a database management application starts to process each index of a database table. A database table can have one or more indexes defined. A database table may not have any indexes defined. In that case, the database management application can proceed to evaluate or process a next database table.

At block 204, a host device(s) for the index and a type of the index is determined. Metadata for the database index can be accessed to determine whether the index is clustered or non-clustered. Metadata can also be accessed to determine a device name, interface, or network address of a device hosting the index. A database index may reside on multiple devices. For instance, a majority of a non-clustered index can reside on a first host device while the keys or data pages of the non-clustered index reside on a second host device.

At block 206, a device type of the host device(s) is determined. For example, a database management application can invoke a system call to determine whether the device hosting the database index is a solid state storage device or a magnetic disk storage device.

At block 208, it is determined whether the index is clustered or non-clustered. When the index type was determined at block 204, an indication of the type could have been recorded. If the index was determined to be clustered, then control flows to block 210. If the index was determined to be non-clustered, then control flows to block 225.

At block 210, it is determined if the host device was determined to be a solid state device. If the host device is a solid state device, then control flows to block 216. Otherwise, control flows to block 212.

At block 216, a clustered solid state device weight is selected. Control flows from block 216 to block 221.

If the host device of the clustered index was determined to be a magnetic disk storage device, then it is determined if the index resides on an inner track or an outer track of the disk at block 212. If the index resides on an inner track of the disk, then control flows to block 214. If the index resides on an outer track of the disk, then control flows to block 218. At block 214, a clustered inner track weight is selected. At block 218, a clustered outer track weight is selected. The selected weight reflects a preference for reading a clustered index from an outer track based on greater efficiency over reading a clustered index from an inner track. The selected weight also reflects a greater efficiency of reading a clustered index from a magnetic disk relative to reading a non-clustered index from a magnetic disk. Control flows from both blocks 214 and 218 to block 221.

At block 221, the cost of reading the index is calculated based on the selected weights. For example, the clustered solid state weight is multiplied against an edge traversal based cost of using a clustered index residing on a solid state device.

At block 223, the calculated cost of reading the index is stored. The calculated cost of reading the index can later be used in calculating an access plan cost that uses the index. From block 223, the next index, if any, is processed.

If the index was determined to be clustered at block 225, then it is determined if the non-clustered index resides on a solid state storage device. If the non-clustered index resides on a solid state storage device, then a non-clustered solid state device weight is selected. Embodiments can define different weights for a clustered index residing on a solid state storage device and for a non-clustered index residing on a solid state storage device, but no necessarily. A same weight can be used for reading an index regardless of type based on the index residing on a solid state storage device. Control flows from block 227 to block 235.

If the non-clustered index was determined to reside on a magnetic disk storage device at block 225, then it is determined if the non-clustered index resides on an outer track of the disk at block 229. If the non-clustered index resides on an outer track of the disk, then a non-clustered outer track weight is selected at block 231. If the non-clustered index resides on an inner track of the disk, then a non-clustered inner track weight is selected at block 233. Control flows from both of blocks 231 and 233 to block 235.

At block 235, it is determined if keys of the non-clustered index reside on a same host device as the non-clustered index. If so, then control flows to block 221. Embodiments can use the weights selected for the non-clustered index if keys of the non-clustered index reside on a same host device. Embodiments can also select another weight for the index keys and/or modify the already selected weight for the non-clustered index to reflect or augment the cost of reading a non-clustered index. If the keys of the non-clustered index reside on a different host device, then control flows to block 301 of FIG. 3.

Figure 3:
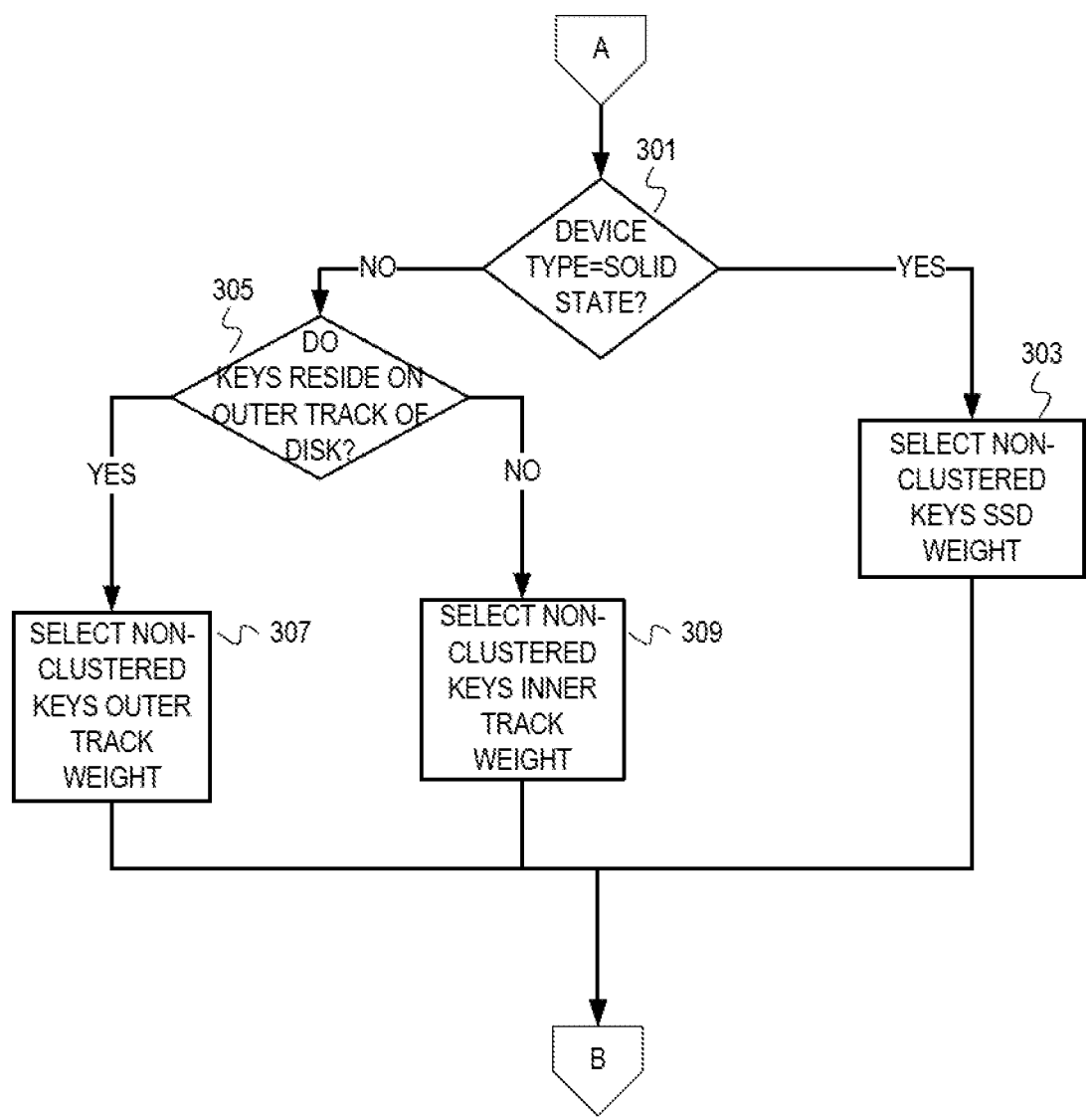
FIG. 3 depicts a flowchart of example operations that continue from FIG. 2.

FIG. 3 depicts a flowchart of example operations that continue from FIG. 2. At block 301, it is determined if the keys reside on a solid state device. If the non-clustered index keys reside on a solid state storage device, then a non-clustered keys solid state device weight is selected. Embodiments can define different weights for a non-clustered index residing on a solid state storage device and for the corresponding keys residing on a solid state storage device, but not necessarily. A same weight can be used for reading a non-clustered index residing on a solid state storage device and for reading the corresponding keys residing on a solid state storage device. Control flows from block 303 to block 221 of FIG. 2.

If the non-clustered index keys were determined to reside on a magnetic disk storage device at block 301, then it is determined if the non-clustered index keys reside on an outer track of the disk at block 305. If the non-clustered index keys reside on an outer track of the disk, then a non-clustered keys outer track weight is selected at block 307. If the non-clustered index keys reside on an inner track of the disk, then a non-clustered keys inner track weight is selected at block 309. Control flows from both of blocks 307 and 309 to block 221 of FIG. 2. If multiple weights are selected for an index, then embodiments can combine the weights in accordance with various techniques. For example, embodiments can apply 60% of a selected weight for a non-clustered index and 40% of a weight for a selected non-clustered index keys weight. Embodiments can also define the weights to account for selection of multiple weights.

Although the above illustrations refer to weights for reading indexes, embodiments are not limited to weights for reading indexes. Embodiments can also utilize weights that affect cost of writing indexes. Weights corresponding to writing indexes of both clustered and non-clustered indexes can be defined to reflect a relatively greater efficiency of writing an index to a magnetic disk storage device than to a solid state storage device. Writing an index, keys, or data to a magnetic disk storage device may be preferred over writing to a solid state storage device because writing to a solid stage storage device can be slower. Writing to a solid state storage device can be slowed from writing to a new page and invalidating the previous page. Groups of contiguous invalidated pages form erase units and invalidated pages become writable after the erase unit has been cleared.

In addition, the above illustrations refer to determining whether an index resides on an inner track or an outer track of a magnetic disk. An index and/or index keys, however, may not reside entirely on an outer track or entirely on an inner track. Embodiments can determine whether an index or index keys primarily reside on an outer track or an inner track. Embodiments can then select a weight(s) accordingly.

In addition to using disk type and index type based weights, the temperature of storage devices can also influence access plan cost. Temperature based weights/coefficients can also be used to affect calculation of access plan costs. Although temperature based weights can be calculated in advance based on periodic calculations and/or historical temperature data, the temperate based weights can be updated more proximate to when a database query is received for increased accuracy.

Figure 4:
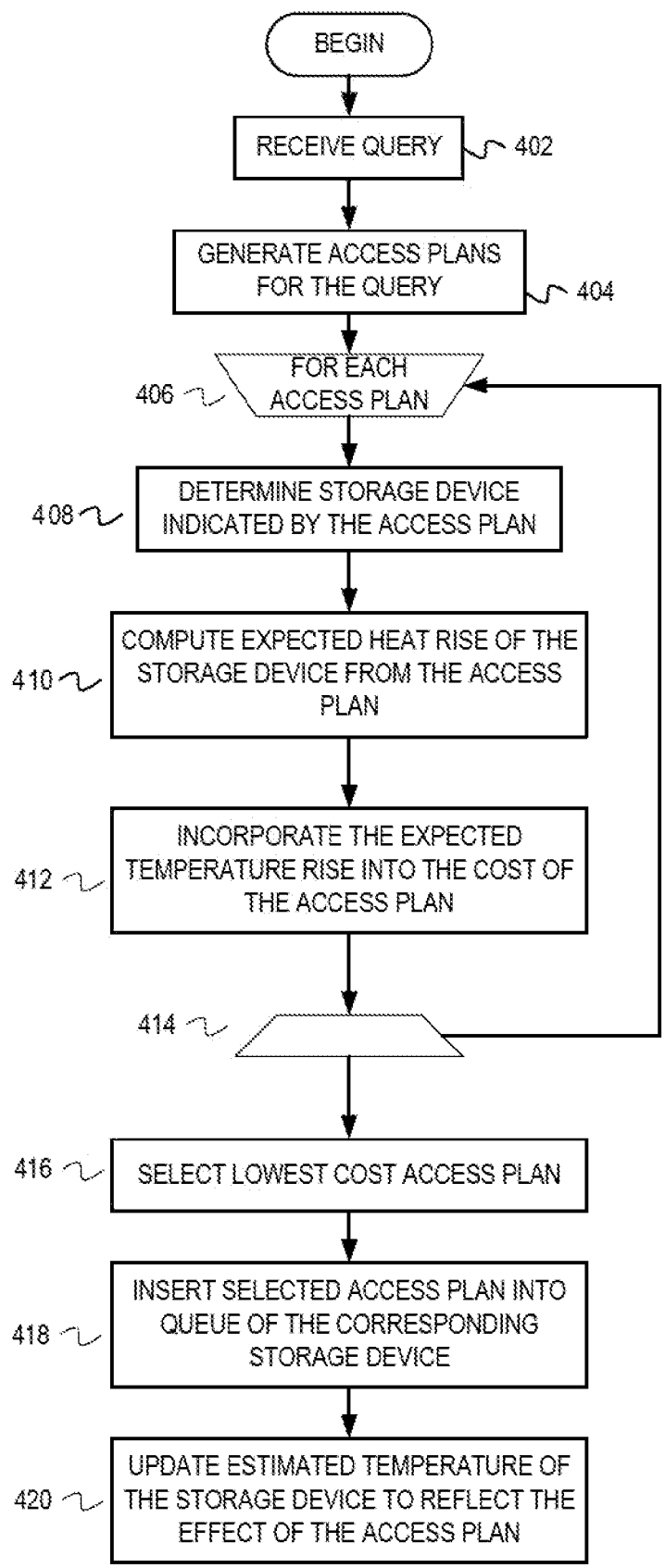
FIG. 4 depicts a flow diagram illustrating example operations for incorporating temperature impact into access plan cost.

FIG. 4 depicts a flow diagram illustrating, example operations for incorporating temperature impact into access plan cost.

At block 402, a database query is received. As discussed above, queries are performed to retrieve data stored in database tables.

At block 404, access plans are generated for the database query.

At block 406, a loop of operations begins for each of the access plans. The loop encompasses blocks 408, 410, and 412 in FIG. 4.

At block 408, a storage device indicated by the access plan is determined. For example, the access plan is examined to determine which storage device(s) hosts the database table(s) that will be accessed for the access plan.

At block 410, an expected temperature rise of the storage device from the access plan is computed. Access plans for a query can involve a different number of input/output operations. Characteristics of individual storage devices will vary and result in differences in temperature rise. The different number of I/O operations on different storage devices can result in different degrees of temperature rise. The temperature rise can impact the operating environment (e.g., room temperature), durability of the storage device, etc. Thus, incorporating temperature rise from an access plan into cost of the access plan can help in implementing policies or strategies (e.g., depressing temperature to reduce energy consumed to cool a data center) and/or provide a more informed cost of an access plan (e.g., hotter storage device may operate slower, factoring in cost of wear on devices into access plan cost, etc.). Computing the expected temperature rise can involve various input value. For example, storage device manufacturers publish data about their storage devices that will indicate how fast a storage device can read a given amount of data or write a given amount of data, and the resulting temperature rise. This information about the storage device can be stored somewhere accessible to a query optimizer (e.g., file, database, online, etc.). For example, a query optimizer can look up that a particular storage device can read 20 GB of data in 15 minutes with a resulting temperature rise of 2 degree Fahrenheit. Implementations are not limited to Fahrenheit can express the effects on a drive in terms of other temperature measurements (e.g., Celsius), or other metrics (e.g., Joules). Although embodiment may initially compute heat rise or temperature rise based on this published data, embodiments can collect information to alter the computation of heat rise or temperature rise. Embodiment can use historical data for a storage device or statistical data for a class of storage devices to more accurately compute heat rise for a storage device. A query optimizer can estimate the amount of data to be accessed for an access plan (e.g., estimate number of rows and multiply by a known size of each row), compute a time to read the data and resulting temperature or heat rise based on at least one of historical information about a storage device and predefined data about the storage device (e.g., manufacturer data or testing data).

Temperature rise or heat rise can also vary based on a current temperature of the storage device. Thus, embodiments can maintain an estimated current temperature of a storage device that accounts for pending access plans in the queue of the storage device. Embodiments can determine a current temperature of a device with components that actively measure current temperature of a storage device and/or the immediate area around a storage device. Embodiments can then modify the current temperature based on the estimated rise of each access plan in a queue of a storage device. Embodiments can periodically recalibrate an estimated current temperature based on the facilities or components that actually measure the current temperature of the storage device.

At block 412, the expected heat rise is incorporated into the cost of the access plan. For example, a coefficient or modifier is applied to the expected heat rise or forecast temperature based on the expected heat rise. The coefficient or modifier normalizes the expected heat rise or forecast temperature (e.g., normalizing degrees Fahrenheit into a cost based on time). Embodiments can also incorporate the heat rise as a weight that is applied to increase, the cost of the access plan or an element of the access plan.

At block 414, the flow of operations either proceeds to the next access plan for the query or continues to block 416.

At block 416, the lowest cost access plan is selected.

At block 418, the selected access plan is inserted into the queue of the corresponding, storage device.

At block 420, the estimated temperature of the storage, device is updated to reflect the effect of the access plan. As stated earlier, the estimated temperature for the storage device is revised to reflect the expected heat rise from the I/O operations incurred by the access plan on the storage device.

Although embodiments can weight each of the described factors equally, embodiments can revise the weights based on heuristics, learning tools, administrator experience, etc. An administrator can configure the weight for an index residing on a solid state device to have more impact on access plan cost than temperature. A database management application can adjust/assign weights for the different factors to reflect varying impacts of the different factors learned by the database management application or a learning module that communicates with the database management application.

The costs associated with index profiles and/or storage device temperature estimations can also impact predicate evaluation ordering. When a query comprises multiple, evaluation order-independent predicates, a database management application can evaluate the predicates in a cost based order. A lower cost predicate may evaluate to condition that terminates the query or avoid further processing of the query ("short circuits the query"). Thus, the database management system reduces the costs of evaluates the predicates by the cost of the remaining unevaluated predicates. In other words, the database management application can evaluate a predicate that involves indexes that are more efficient to access and/or reside on cooler storage devices than a predicate that involves indexes that are less efficient to access and/or reside on wanner storage devices.

It should be understood that the flowcharts depicted in FIGS. 2 and 3 are examples meant to aid in understanding embodiments and should not be used to limit embodiments or limit scope of the claims. Embodiments may perform additional operations, fewer operations, operations in a different order, operations in parallel, and some operations differently. For example, embodiments can determine an index type and postpone determining storage device type for the index until after block 208.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memoir) (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart, and/or block diagram block or blocks.

Figure 5:
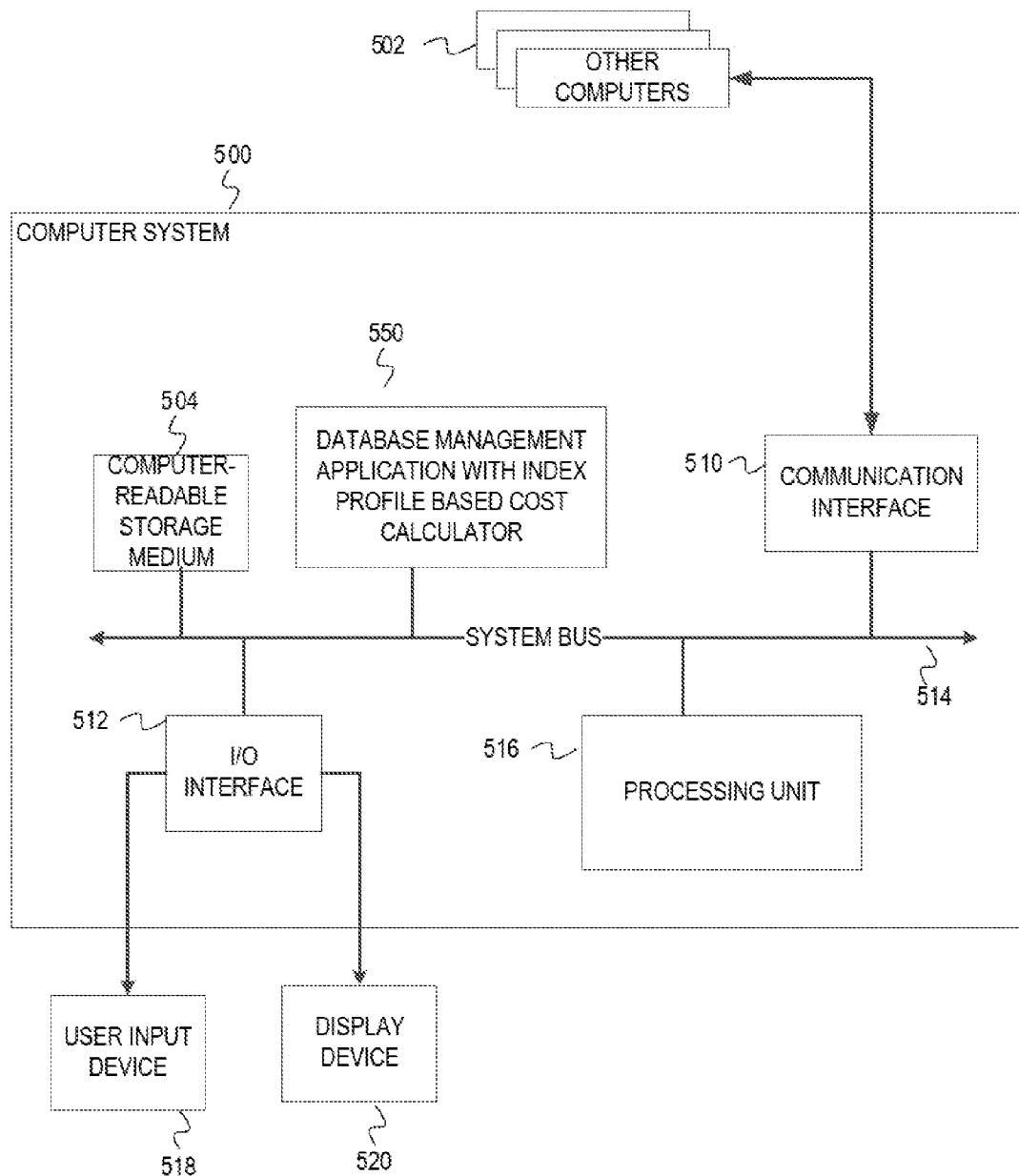
FIG. 5 depicts an example computer system.

FIG. 5 depicts an example computer system. A computer system 500 includes a processor unit 516 (possibly including multiple processors, multiple cores, multiple nodes, and/or implementing multi-threading, etc.). The computer system 500 includes computer-readable storage medium 504. The computer-readable storage medium 504 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 514 (e.g., PCI, ISA, PCI-Express, HyperTransport®, InfiniBand®, NuBus, etc.), a communication interface 510 (e.g., an ATM interface, an Ethernet interface, a Frame Relay interface, SONET interface, wireless interface, etc.), and an I/O (input/output) interface 512. The communication interface 510 allows the computer system 500 to communicate (e.g., send and receive data) with other computers 502. Input/output interface adapters in computers can implement user-oriented input/output through, for example, software drivers and computer hardware. The I/O interface may utilize various display devices 520, such as computer display screens, and various user input devices 518, such as keyboards and mice.

The computer system also comprises a database management application 550. The database management application 550 includes an index profile based cost calculator. The index profile based cost calculator collects profile information of indexes, index keys, and/or data pages. The index profile based cost calculator uses the profile information to select weights that influence cost of reading and/or writing indexes, index keys, and/or data pages. The weights are used to calculate corresponding read and/or write costs to enhance access plan cost calculations and access plan selection. Some or all of this functionality may be implemented with code embodied in the memory 504 and/or processor unit 516, co-processors, other cards, etc. Any one of these functionalities may be partially (or entirely) implemented in hardware and/or on the processing unit 516. For example, the functionality may be implemented with an application specific integrated circuit, in logic implemented in the processing unit 416, in a co-processor on a peripheral device or card, etc. Further, realizations may include fewer or additional components not illustrated in FIG. 5 (e.g., video cards, audio cards, additional network interfaces, peripheral devices, etc.). The processor unit 516, the I/O interface 512, and the communication interface 510 are coupled to the bus 514. Although illustrated as being coupled to the bus 514, the memory 504 may be coupled to the processor unit 516.

While the embodiments are described with reference to various implementations and exploitations, it will be understood that these embodiments are illustrative and that the scope of the inventive subject matter is not limited to them. In general, techniques for profile index based weight selection and cost calculation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for determining costs for access plans for databases access, the method comprising:
    collecting profile data for each of a plurality of database indices of a database hosted across a plurality of storage devices, wherein the profile data at least indicates whether each of the plurality of database indices is clustered or non-clustered and a type of one of the plurality of storage devices that hosts each of the database indices;
    selecting weights for each of the plurality of database indices based, at least in part, on the profile data including whether each of the plurality of database indices is clustered and the type of the one of the plurality of storage devices;
    calculating a respective cost for each of the plurality of database indices using the selected weights;
    associating in storage the respective cost for each of the plurality of database indices with each of the database indices; and
    computing access plan costs for a plurality of access plans generated for a query responsive to receiving the query, wherein said computing the access plan costs uses the respective costs for those of the plurality of database indices that correspond to the plurality of access plans.

2. The method of claim 1, wherein said associating in the storage the respective cost for each of the plurality of database indices comprises storing the respective cost as respective metadata of each of the database indices.

3. The method of claim 1, wherein the respective cost represents a cost of reading each of the database indices.

4. The method of claim 1, wherein the respective cost comprises at least one of a number of input/output operations and units of time associated with the each of the plurality of database indices.

5. The method of claim 1, further comprising:
    selecting writing related weights for the plurality of database indices based, at least in part, on the profile data;
    calculating a respective writing cost for each of the plurality of database indices using the selected writing related weights, wherein the respective writing cost represents a cost of writing each of the plurality database indices; and
    associating in the storage the respective writing cost for each of the database indices with the each of the database indices.

6. The method of claim 1, wherein the profile data also indicates whether each of the database indices resides on an outer track or inner track of a magnetic disk for those of the plurality of database indices that reside on a magnetic type of storage device.

7. The method of claim 1, wherein said selecting weights for each of the plurality of database indices comprises selecting from a plurality of weights that comprise a first weight for one of the plurality of database indices that resides on a solid state type storage device, a second weight for one of the plurality of the database indices that is clustered and resides on an outer track of a magnetic type of storage device, a third weight for one of the plurality of the database indices that is clustered and resides on an inner track of the magnetic type of storage device, a fourth weight for one of the plurality of the database indices that is non-clustered and resides on the outer track of the magnetic type of storage device, and a fifth weight for one of the plurality of the database indices that is non-clustered and resides on the inner track of the magnetic type of storage device.

8. The method of claim 1, further comprising:
    for each of the plurality of access plans,
        determining a storage device of the plurality of storage devices indicated by an access plan;
        computing a heat rise of the storage device expected from accessing the storage device in accordance with the access plan; and
        incorporating the heat rise into an access plan cost of the access plan.

9. A computer program product for database system infrastructure informed computation of access plan costs, the computer program product comprising:
    a computer readable storage medium having computer readable program code embodied therewith, the computer readable program code configured to,
        determine physical locations of a plurality of database indices in a database system, wherein the physical locations correspond to storage devices of the database system;
        determine whether each of the plurality of database indices is clustered or non-clustered;
        determine characteristics of the storage devices that host the plurality of indices based, at least in part, on the physical locations of the plurality of database indices;
        select weights for the plurality of database indices based on the characteristics and whether each of the database indices is clustered or non-clustered;
        compute costs of accessing the plurality of database indices based, at least in part, on the weights; and
        store the computed costs for computing the access plan costs of access plans that use the plurality of database indices.

10. The computer program product of claim 9, wherein the computer readable program code is further configured to:
    use one or more of the computed costs in computing a plurality of access plan costs for a plurality of access plans generated for a query, wherein the one or more of the computed costs are for those of the plurality of database indices that correspond to the plurality of access plan costs.

11. The computer program product of claim 10, wherein the computer readable program code is further configured to:
    for each of the plurality of access plans, determine a storage device of the storage devices indicated by an access plan;
compute a heat rise of the storage device expected from accessing the storage device in accordance with the access plan; and
incorporate the heat rise into an access plan cost of the access plan.

12. The computer program product of claim 11, wherein the computer-readable program code is further configured to maintain an estimated current temperature of the storage device based, at least in part, on computed heat rises expected from a set of access plans pending in a queue for the storage device.

13. The computer program product of claim 9, wherein the computer readable program code is further configured to:
select writing related weights for the plurality of database indices based, at least in part, on the profile data;
compute a respective writing cost for each of the plurality of database indices using the selected writing related weights, wherein the respective writing cost represents a cost of writing each of the plurality of database indices; and
associating in storage the respective writing cost with the respective database index.

14. The computer program product of claim 13, wherein the characteristics of the storage devices comprise storage device type, wherein the storage device type indicates one of solid state type of storage device state and magnetic type of storage device.

15. The computer program product of claim 14, wherein the computer readable program code is further configured to determine, for each of the plurality of database indices that reside on the magnetic type of storage device, whether the database index resides on an outer track or inner track of a magnetic disk.

16. A computer program product for database system infrastructure computation of access plan costs, the computer program product comprising:
a computer readable storage medium having computer readable program code embodied therewith, the computer readable program code configured to,
collect profile data for each of a plurality of database indices of a database hosted across a plurality of storage devices, wherein the profile data at least indicates whether each of the plurality of database indices is clustered or non-clustered and a type of one of the plurality of storage devices that hosts each of the database indices;
select weights for each of the plurality of database indices based, at least in part, on the profile data including whether each of the plurality of database indices is clustered and the type of the one of the plurality of storage devices;
calculate a respective cost for each of the plurality of database indices using the selected weights;
associate in storage the respective cost for each of the plurality of database indices with the each of the database indices;
compute access plan costs for a plurality of access plans generated for a query responsive to receiving the query, wherein the computer readable program code to compute the access plan costs comprises the computer readable program code being configured to use the respective costs calculated for those of the plurality of database indices that correspond to the plurality of access plans.

17. The computer program product of claim 16, wherein the computer readable program code is further configured to:
select writing related weights for the plurality of database indices based, at least in part, on the profile data;
calculate a respective writing cost for each of the plurality of database indices using the selected writing related weights, wherein the respective writing cost represents a cost of writing each of the database indices; and
associate in the storage the respective writing cost for each of the database indices with the each of the database indices.

18. The computer program product of claim 16, wherein the profile data also indicates whether the database index resides on an outer track or inner track of a magnetic disk for those of the plurality of database indices that reside on a magnetic type of storage device.

19. The computer program product of claim 16, wherein the computer readable program code configured to select weights for each of the plurality of database indices comprises the computer readable program code being configured to select from a plurality of weights that comprise a first weight for one of the plurality of database indices that resides on a solid state type storage device, a second weight for one of the plurality of database indices that is clustered and resides on an outer track of a magnetic type of storage device, a third weight for one of the plurality of database indices that is clustered and resides on an inner track of the magnetic type of storage device, a fourth weight for one of the plurality of database indices that is non-clustered and resides on the outer track of the magnetic type of storage device, and a fifth weight for one of the plurality of database indices that is non-clustered and resides on the inner track of the magnetic type of storage device.

20. The computer program product of claim 16, wherein the computer readable program code is further configured to:
for each of the plurality of access plans,
determine a storage device of the plurality of storage devices indicated by an access plan;
compute a heat rise of the storage device expected from accessing the storage device in accordance with the access plan; and
incorporate the heat rise into an access plan cost of the access plan.

21. An apparatus comprising:
a processor unit;
a network interface operable to receive database queries; and
an index profile based cost calculator configured to:
determine physical locations of a plurality of database indices in a database system, wherein the physical locations correspond to storage devices of the database system;
determine whether each of the plurality of database indices is clustered or non-clustered;
determine characteristics of the storage devices that host the plurality of indices based, at least in part, on the physical locations of the plurality of database indices;
select weights for the plurality of database indices based on the characteristics and whether each of the database indices is clustered or non-clustered;
compute costs for accessing the plurality of database indices based, at least in part, on the weights; and
store the computed costs for computing access plan costs of access plans that use the plurality of database indices.

22. The apparatus of claim 21, further comprising a computer readable storage medium encoded with program instructions to implement the index profile based cost calculator.

23. The apparatus of claim 22, wherein the computer readable storage medium also encodes program instructions to implement a database query optimizer that invokes the program instructions to implement the index profile based cost calculator.

* * * * *